A. WILLMANN.
Potato-Diggers.

No. 145,037. Patented Nov. 25, 1873.

WITNESSES. INVENTOR
W. T. Newman, Adam Willmann
Wm. H. Brereton Jr. By Leggett & Leggett
Attorneys.

UNITED STATES PATENT OFFICE.

ADAM WILLMANN, OF MOUNT CARMEL, ILLINOIS.

IMPROVEMENT IN POTATO-DIGGERS.

Specification forming part of Letters Patent No. 145,037, dated November 25, 1873; application filed October 18, 1873.

*To all whom it may concern:*

Be it known that I, ADAM WILLMANN, of Mount Carmel, in the county of Wabash and State of Illinois, have invented certain new and useful Improvements in Potato-Plows; and I do hereby declare the following to be a full, clear, and exact description of the invention, such as will enable others skilled in the art to which it pertains to make and use it, reference being had to the accompanying drawings, which form part of this specification.

My invention relates to certain new and useful improvements in potato-plows.

Figure 1:
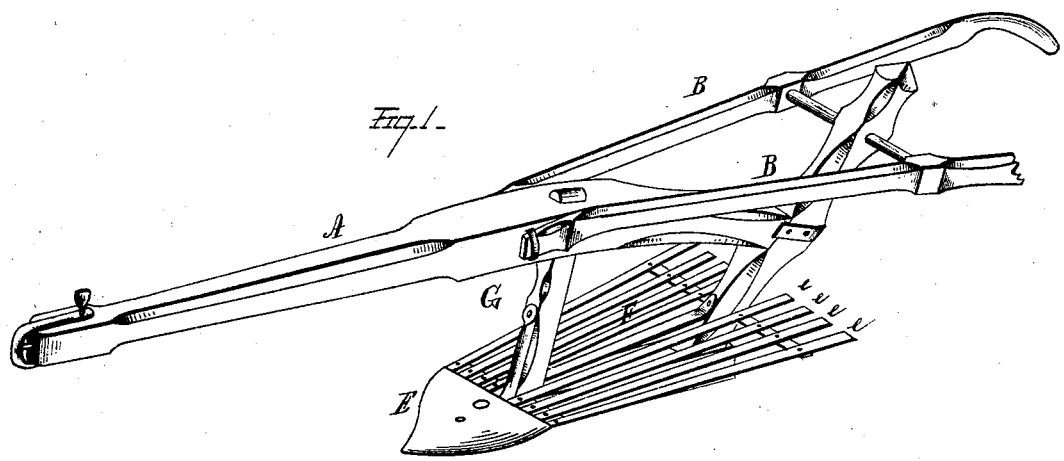
Figure 2:
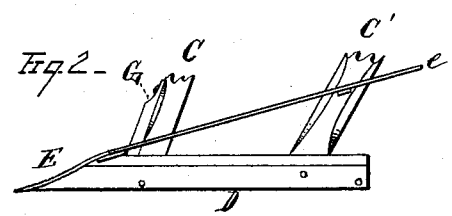

In the drawings, Figure 1 represents a perspective view of the plow; Fig. 2, a sectional side view.

My invention consists in certain combinations and arrangements of parts, as hereinafter set forth and claimed, in which—

A represents the usual plow-beam, provided with handles B and standards C C'. D is a shoe attached to the bottom of the standards C C', and receiving at its front end a share, E. Attached to this share are the tines $e$ of the potato-screen F, which extend upward and backward from the share in an elevated and slightly-oblique direction, as shown. G is a colter attached to the standard C. The share E is bent downward, forming nearly a straight line with the potato-screen, as shown, to a short distance from the point, where it curves slightly upward, and is on a level with the bottom of the shoe D.

By this construction and arrangement it will be seen that the plow is always held equal—that is, the shoe, and the peculiar shape of the share, prevent the plow going too deep or too shallow; and keep it at a regular depth in the ground, thus making it easier of draft and to be managed. The colter, cutting the earth, weeds, &c., in front, facilitates the passage of the plow. The screen being inclined, as shown, and quite long, more space and time are allowed for the escape of the dirt through the screen, and the potatoes are consequently more thoroughly cleaned.

Having thus described my invention, what I claim as new, and desire to secure by Letters Patent, is—

The combination of the plow-beam A, standards C C', horizontal shoe D, nose E, and screen F, said screen being flat, and composed of the diverging tines $e$ fixed at an incline and upon the same general inclination with the nose E, substantially as described.

In testimony that I claim the foregoing I have hereunto set my hand and seal this 11th day of October, 1873.

ADAM WILLMANN. [L. S.]

Witnesses:
 FRANK W. HAVILL,
 HUGO KNERSCHNER.